(12) United States Patent
Mannemala et al.

(10) Patent No.: US 9,210,656 B2
(45) Date of Patent: Dec. 8, 2015

(54) LISTEN INTERVAL (LI) SELECTION FOR WLAN CLIENT

(75) Inventors: Chaitanya Mannemala, Santa Clara, CA (US); Guido Robert Frederiks, Aptos, CA (US); Sunit Pujari, Ganjam (IN); Ashok Ranganath, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 321 days.

(21) Appl. No.: 13/563,157

(22) Filed: Jul. 31, 2012

(65) Prior Publication Data

US 2014/0036746 A1 Feb. 6, 2014

(51) Int. Cl.
*H04W 52/02* (2009.01)
*H04W 76/04* (2009.01)

(52) U.S. Cl.
CPC ........ *H04W 52/0216* (2013.01); *H04W 76/048* (2013.01)

(58) Field of Classification Search
CPC .................. H04W 52/0216; H04W 76/048
USPC ........................................................ 370/311
See application file for complete search history.

(56) References Cited

U.S. PATENT DOCUMENTS

| | | | |
|---|---|---|---|
| 7,274,929 B1 | 9/2007 | Banginwar | |
| 7,505,795 B1 | 3/2009 | Lim et al. | |
| 7,613,156 B2 * | 11/2009 | Rittle et al. | 370/338 |
| 8,160,045 B1 | 4/2012 | Chhabra | |
| 8,351,996 B2 * | 1/2013 | Thomas et al. | 455/574 |
| 2004/0192284 A1 * | 9/2004 | Vaisanen et al. | 455/422.1 |
| 2007/0297438 A1 | 12/2007 | Meylan et al. | |
| 2010/0226299 A1 | 9/2010 | Sumida et al. | |
| 2011/0153789 A1 * | 6/2011 | Vandwalle et al. | 709/221 |
| 2012/0093243 A1 * | 4/2012 | Okada et al. | 375/259 |
| 2013/0223308 A1 * | 8/2013 | Chandra et al. | 370/311 |

FOREIGN PATENT DOCUMENTS

EP 0650279 A1 4/1995

OTHER PUBLICATIONS

Perez-Costa, et al., "A protocol enhancement for IEEE 802.11 distributed power saving mechanisms no data acknowledgement," Proceedings from 16th IST: Mobile and Wireless Communications Summit, Heidelberg: NEC Network Lab., pp. 1-7.
International Search Report and Written Opinion—PCT/US2012/049198—ISA/EPO—May 2, 2013.

* cited by examiner

*Primary Examiner* — Andrew Lai
*Assistant Examiner* — Albert Shih
(74) *Attorney, Agent, or Firm* — Holland & Hart LLP

(57) ABSTRACT

The listen interval of a WLAN client is selected to have one of a plurality of values, including a start listen interval (SLI) and one or more longer listen intervals (e.g., transient listen interval (TLI), maximum listen interval (MLI)). The listen interval is set to SLI in response to (1) detecting that an applications processor of the WLAN client is in an awake state, (2) detecting transmit/receive activity on the wireless link, and (3) failing to detect an expected beacon signal on the wireless link. If the listen interval is set to MLI (or TLI) and the WLAN client fails to detect an expected beacon signal (beacon miss), the listen interval is temporarily set to SLI. If the WLAN client then detects an expected beacon signal before detecting a predetermined number of consecutive beacon misses, the listen interval is immediately returned to the original listen interval MLI (or TLI).

16 Claims, 5 Drawing Sheets

LISTEN INTERVAL (LI) SELECTION FOR WLAN CLIENT

BACKGROUND

1. Field of the Disclosure

This disclosure relates generally to apparatus and methods for a wireless LAN client. More particularly, the disclosure relates to an apparatus and method for listen interval (LI) selection for a wireless local area network (WLAN) client.

2. Related Art

With the increased popularity of social networking in today's world, the need for smart phones to connect to a network has become very prominent. WLAN technology (following the IEEE 802.11 protocol) is one of the key and cost efficient technologies, which allows smart phones to connect to a network. Because smart phones are battery powered devices, the challenge for WLAN is to maintain connectivity with a backbone network with reduced power consumption, especially during standby (no traffic condition). WLAN power consumption accounts for a significant portion of overall battery power, thereby affecting the standby time of a smart phone. It is desirable to reduce the standby power of a smart phone, thereby significantly increasing the standby time of the smart phone. The following briefly describes the power save protocol as provided by the IEEE 802.11 specification.

According to the IEEE 802.11 specification, a wireless station (STA), such as a smart phone, specifies a listen interval (LI) during an association phase (e.g., set up) with a wireless access point (AP). The LI determines how frequently the STA wakes up to listen to a beacon signal that is periodically transmitted from the AP. For example, a LI of 2 may be selected to cause the STA to wake up to receive every other beacon signal transmitted from the AP. In addition, the STA should also follow the DTIM beacon (Delivery Traffic Indication Message) output by the AP for the broadcast frames to be delivered after the DTIM beacon. If the STA ignores broadcast frames, it can follow the LI specified during the association phase. If the LI is specified as a high value, power consumption may be significantly reduced. However, the high LI value will adversely affect the performance of the WLAN link, because the STA will have to sense traffic that has been buffered at the AP for a long time. For example, if the beacon interval is 100 ms and the LI specified by the STA is 5, a worse case latency of 500 ms (5×100 ms) is introduced for sensing the presence of buffered frames on the AP. This latency continues to be present for fetching the downlink frames whenever the STA enters a power save mode. For these reasons, it is common for the LI to be set to 1, such that the STA wakes up to listen for each beacon signal, thereby reducing latency on the data path. However, this raises a concern with respect to increased power consumption by the STA.

SUMMARY OF THE DISCLOSURE

In accordance with the present invention, the listen interval of a WLAN client (STA) is selected to have one of a plurality of values, including a start listen interval (SLI) and one or more longer listen intervals (e.g., a transient listen interval (TLI) and a maximum listen interval (MLI)). The listen interval is set to the start listen interval SLI in response to (1) detecting that an applications processor of the WLAN client is in an awake state, (2) detecting transmit/receive activity on the wireless link, or (3) failing to detect an expected beacon signal on the wireless link. The listen interval is increased from SLI to a longer listen interval (e.g., to the transient listen interval TLI) in response to detecting the absence of transmit/receive activity on the wireless link over a number (N) of consecutive start listen intervals. The listen interval can be further increased from the transient listen interval TLI to a longer listen interval (e.g., to the maximum listen interval MLI) in response to detecting the absence of transmit/receive activity on the wireless link over a number (M) of consecutive transient listen intervals.

If the listen interval is set to one of the longer listen intervals (TLI or MLI) and the WLAN client fails to detect an expected beacon signal (beacon miss), the listen interval is temporarily set (reduced) to the start listen interval SLI. In response, the WLAN client wakes up at the start listen interval SLI, and attempts to detect an expected beacon signal. If the WLAN client detects an expected beacon signal, before detecting a predetermined number (X) of consecutive beacon misses, the listen interval is immediately returned to the longer listen interval (TLI or MLI) that was being implemented at the time the original beacon miss was detected. In this manner, a relatively long listen interval can be maintained in the presence of fewer than X consecutive beacon misses.

The present invention will be more fully understood in view of the following description and drawings.

DETAILED DESCRIPTION

Figure 1:
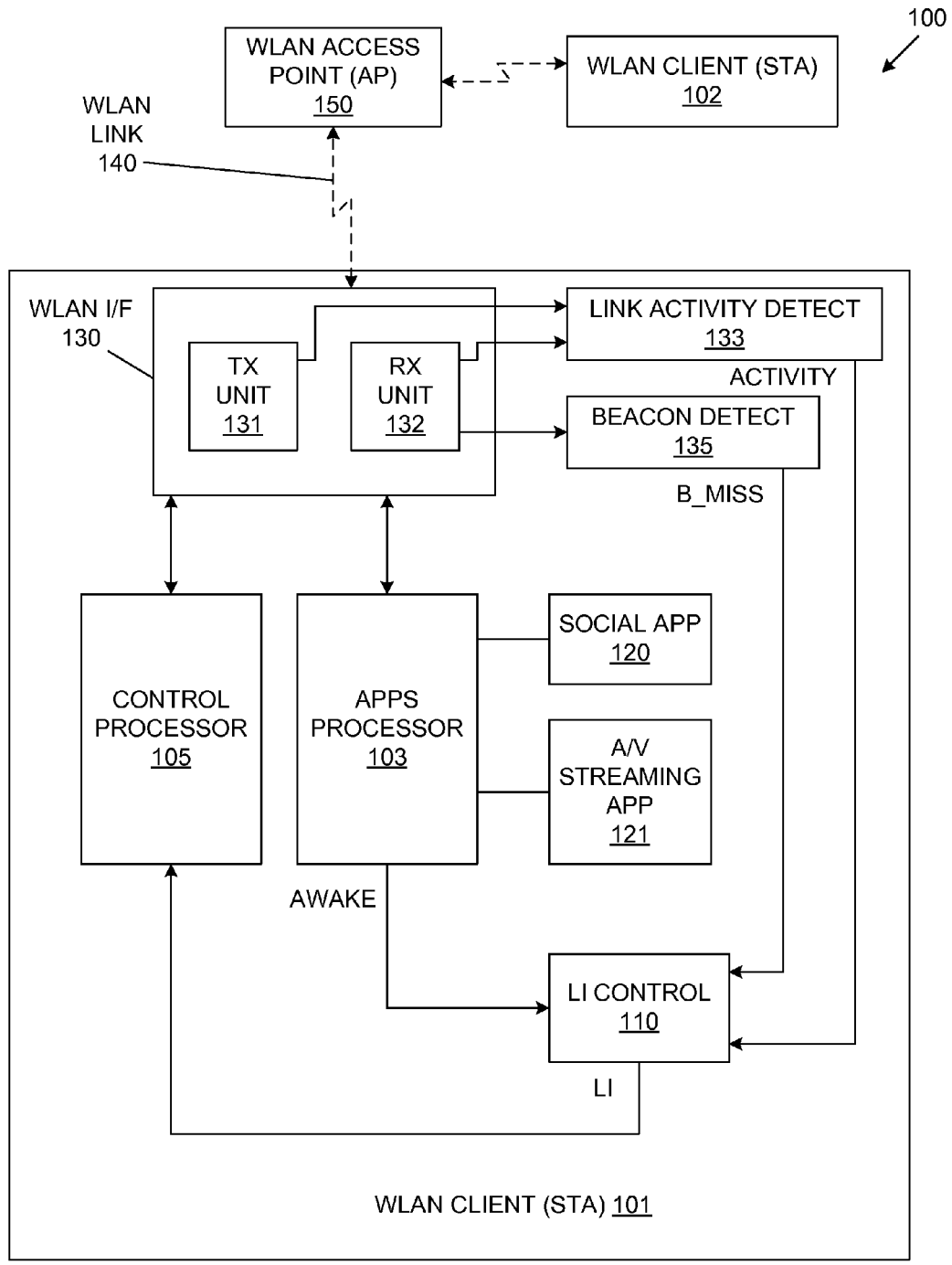
FIG. 1 is a block diagram of a wireless local area network (WLAN) that includes WLAN clients and a WLAN access point in accordance with one embodiment of the present invention.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Various embodiments of a telescopic listen interval (LI) capability for a wireless local area network (WLAN) client (STA) are described herein.

At least one embodiment is directed to dynamically increasing or decreasing the wakeup frequency of a WLAN client based on activity on a link, in order to save on power consumption at the WLAN client. In various embodiments, a WLAN client is configured for three listen intervals, namely a Start Listen Interval (SLI), a Transient Listen Interval (TLI) and a Maximum Listen Interval (MLI), wherein MLI>TLI>SLI. In accordance with one embodiment, when the WLAN client associates with a WLAN access point (AP), the WLAN client specifies the maximum listen interval (MLI) as its listen interval. If the WLAN access point is able to accept the maximum listen interval (MLI) as the listen interval, this ensures that the WLAN access point will be able to retain buffered data even under worst-case conditions (i.e., when the WLAN client implements the maximum listen interval (MLI)).

In accordance with another embodiment, the WLAN client initially sets its listen interval (LI) equal to the start listen interval (SLI), and eventually ramps up this listen interval (LI) to the maximum listen interval (MLI) when there is no activity on the WLAN link. The listen interval (LI) can be dropped down to the start listen interval (SLI) in response to detecting activity on the WLAN link (e.g., when a voice call occurs on the WLAN link). In accordance with another embodiment, the listen interval (LI) of the WLAN client can be dropped down to the start listen interval (SLI) in response to detecting that an applications (Apps) processor of the WLAN client has entered an 'awake' state (i.e., has exited a power save, or sleep, state). In accordance with another embodiment, the listen interval (LI) of the WLAN client can be dropped down to the stat listen interval (SLI) in response to failing to detect an expected beacon signal on the WLAN link.

FIG. 1 is a block diagram of a WLAN 100 that includes WLAN clients (STAs) 101-102 and WLAN access point (AP) 150 in accordance with one embodiment of the present invention. As described in more detail below, WLAN client 101 operates in response to beacon signals periodically transmitted by the access point 150 on WLAN link 140. Although WLAN client 102 is not described in detail, it is understood that WLAN client 102 may be substantially identical to WLAN client 101, and may operate in the same manner as WLAN client 101 in response to beacon signals transmitted by the access point 150. It is further understood that additional WLAN clients may be included in WLAN 100.

WLAN client 101 includes applications processor 103, control processor 105, listening interval (LI) control circuit 110, social application 120, audio/video (A/V) streaming application 121, WLAN interface 130, link activity detecting unit 133 and beacon detecting unit 135. WLAN interface 130 include transmit unit 131, which transmits information to AP 150 (and/or WLAN client 102) over WLAN link 140, and receive unit 132, which receives information (including beacon signals) from AP 150 (and/or WLAN client 102) over WLAN link 140.

Link activity detecting unit 133 monitors the transmit unit 131 and the receive unit 132 to detect any activity on the WLAN link 140 (e.g., uplink or downlink activity). Upon detecting the presence of such transmit/receive activity, link activity detecting unit 133 activates a control signal (ACTIVITY) to identify this condition. Link activity detecting unit 133 provides the ACTIVITY control signal to listen interval control circuit 110.

Beacon detecting unit 135 monitors the receive unit 132 to determine whether a beacon signal is detected during a listening interval. Upon detecting that an expected beacon signal is not detected during a listening interval, beacon detecting unit 135 activates a control signal (B_MISS) to indicate this condition. Beacon detecting unit 135 provides the B_MISS control signal to listen interval control circuit 110. In accordance with one embodiment, the link activity detecting unit 133 and the beacon detecting unit 135 are implemented within receive unit 132.

Applications processor 103 is capable of running various applications, such as social application 120 and/or audio/video (AV) streaming application 121. Activity over the WLAN link 140 will generally begin with applications processor 103 waking up within WLAN client 101. For example, social application 120 typically runs background tasks on the applications processor 103, wherein the social application 120 periodically wakes up the applications processor 103 to synchronize data from a server (not shown) via WLAN access point 150 over the WLAN link 140. In addition, the applications processor 103 is required to be in an awake state to run the A/V streaming application 121. In accordance with one embodiment, applications processor 103 provides a control signal (AWAKE) that is activated when the applications processor 103 is in the awake state, and is deactivated when the applications processor 103 is not in the awake state. Applications processor provides the AWAKE control signal to listen interval control circuit 110.

As described in more detail below, the listen interval control circuit 110 generates a listen interval value (LI) in response to the received ACTIVITY, B MISS and AWAKE control signals. That is, the listen interval control circuit 110 generates a listen interval value LI in response to: (1) whether the applications processor 103 is in an awake state, (2) whether any unicast transmit/receive activity is detected on the WLAN link 140, and (3) whether there is a failure to detect an expected beacon signal on the WLAN link 140.

Listen interval control circuit 110 provides the listen interval value (LI) to control processor 105. In response, control processor 105 wakes up at an interval specified by the listen interval value (LI), and listens (via the receive unit 132) for a beacon signal transmitted by the WLAN access point 150 on WLAN link 140. Upon detecting a beacon signal, the control processor 105 determines whether this beacon signal includes a delivery traffic indication message (DTIM). If so, this means that the WLAN access point 150 is buffering data to be transmitted to WLAN client 101. Under these conditions, the control processor 105 remains on and facilitates the transfer of the buffered data from the WLAN access point 150 to WLAN client 101.

In accordance with one embodiment, the listen interval value LI specifies a number of beacon intervals. Note that the WLAN access point 150 periodically transmits beacon signals with a predetermined beacon interval (e.g., one beacon signal every 100 ms). A listen interval value LI of '1' therefore specifies a listen interval equal to one beacon interval, such that the WLAN client 101 will wake up once every 100 ms (i.e., once every beacon interval) to detect a beacon signal. Similarly, a listen interval value of '3' specifies a listen interval equal to three beacon intervals, such that the WLAN client 101 will wake up once every 300 ms (i.e., once every three beacon intervals) to listen for a beacon signal.

In one embodiment, listen interval control circuit 110 is implemented by firmware. In another embodiment, the functionality of listen interval control circuit 110 is implemented by control processor 105.

The operation of listen interval control circuit 110 will now be described in more detail. In accordance with one embodiment, the listen interval value LI is initially set to a predetermined one of the possible listen interval values, SLI, TLI or MLI. For example, listen interval control circuit 110 may initially set the listen interval value equal to the start listen interval, SLI.

If the listen interval control circuit 110 determines that the applications processor 103 is in the awake state (i.e., detects that the AWAKE control signal has been activated), then listen interval control circuit 110 sets the listen interval value (LI) equal to the start listen interval, SLI. As described above, the start listen interval SLI is the shortest of the three listen intervals. Thus, selecting the start listen interval SLI results in a relatively small latency for fetching downlink frames. However, the start listen interval SLI also results in relatively high power consumption, because the control processor 105 must wake up often.

If listen interval control circuit 110 determines that the applications processor 103 is not in the awake state (i.e., detects that the AWAKE control signal has been deactivated), then listen interval control circuit 110 controls the listen interval value LI in response to transmit/receive activity detected on WLAN link 140, as well as the failure to detect expected beacon signals on WLAN link, in a manner described in more detail below.

In general, when the applications processor 103 is not in the awake state, WLAN client 101 can ramp up the listen interval value LI based on the absence of transmit/receive activity on the WLAN link 140. For example, if listen interval control circuit 110 detects there is no transmit/receive activity on the WLAN link 140 (i.e., the ACTIVITY control signal is deactivated) over a period of N (configurable) beacon intervals (N being a positive integer, e.g., 5 or more), then listen interval control circuit 110 will ramp up the listen interval value LI from the start listen interval SLI to the transient listen interval TLI. The number N of beacon intervals that must elapse before increasing the listen interval value LI from SLI to TLI is hereinafter referred to as the first inactivity transition value.

Similarly, if the listen interval LI is equal to TLI, and listen interval control circuit 110 detects there is no transmit/receive activity on the WLAN link 140 over a period of M (configurable) beacon intervals (M being a positive integer, e.g., 5 or more), then listen interval control circuit 110 will ramp up the listen interval value LI from the transient listen interval TLI to the maximum listen interval MLI. The number M of beacon intervals that must elapse before increasing the listen interval LI from TLI to MLI is hereinafter referred to as the second inactivity transition value.

If the listen interval value LI is equal to either TLI or MLI, and listen interval control circuit 110 detects transmit/receive activity on WLAN link 140 (i.e., detects that the ACTIVITY control signal is activated), then listen interval control circuit 110 immediately reduces the listen interval value LI (from TLI or MLI) to the start listen interval SLI. In accordance with the teachings above, listen interval control circuit 110 will maintain the listen interval value LI at SLI for at least N beacon intervals, as specified by the first inactivity transition value.

In one instance, the transmit/receive activity detected by listen interval control circuit 110 is receive activity. In this case, reducing the listen interval value LI to SLI in the above-described manner advantageously reduces the latency of future downlink frames, thus limiting the latency for fetching buffered frames stored by WLAN access point 150.

In another instance, the transmit/receive activity detected by listen interval control circuit 110 is transmit activity. In this case, a transmit event (from WLAN client 101 to AP 150) is typically associated with a receive event (from AP 150 to WLAN client 101), with a network delay existing between these two events. As a result, reducing the listen interval value LI to SLI as soon as a transmit event is sensed, and keeping the listen interval value LI at SLI for a certain time period (i.e., at least N beacon intervals), can ensure that the associated receive event occurs while the listen interval value LI is equal to SLI. Controlling the listen interval value LI in this manner will likely reduce the delays encountered in fetching buffered downlink frames as well.

Figure 2:
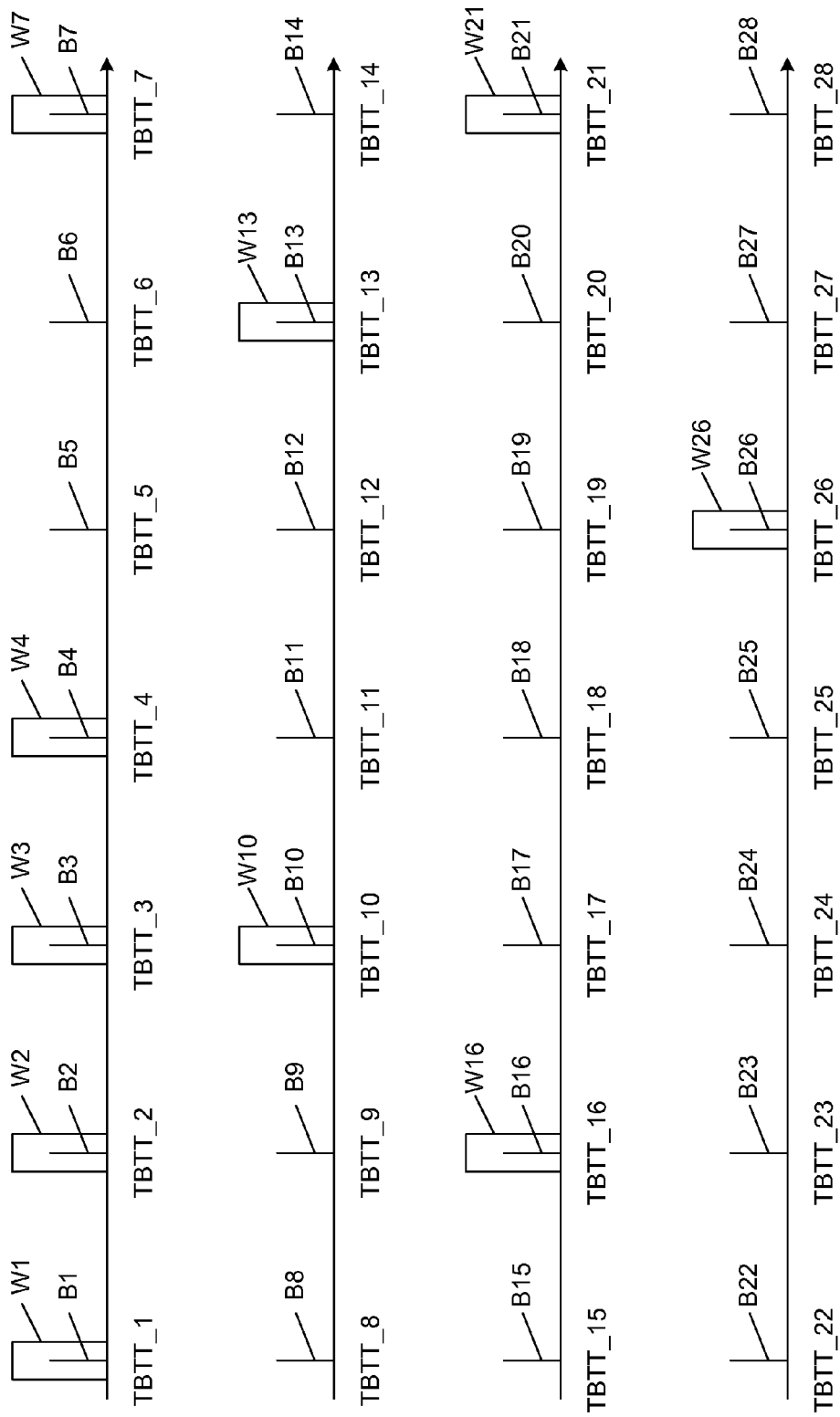
FIG. 2 is a timing diagram illustrating a method for telescopically increasing the listen interval of a WLAN client of FIG. 1 in accordance with one embodiment of the invention.

FIG. 2 is a timing diagram illustrating the control of the listen interval for WLAN client 101 in accordance with one embodiment of the invention. As illustrated by FIG. 2, WLAN access point 150 periodically transmits beacon signals B1-B28 at target beacon transmission times TBTT_1-TBTT_28, respectively. In one example, the beacon signals B1-B28 are transmitted with a beacon interval of 100 ms (e.g., TBTT_2-TBTT_1=100 ms). In the illustrated example, listen interval control circuit 110 implements a start listen interval SLI of 1, a transient listen interval TLI of 3 and a maximum listen interval MLI of 5. Listen interval control circuit 110 also implements a first inactivity transition value N equal to 3, and a second inactivity transition value M equal to 4. Although the first and second inactivity transition values N and M are set to different values in the present example, it is understood that these values N and M can be set to the same value in other embodiments. Moreover, although the first inactivity transition value N is less than the second inactivity transition value M in the described example, it is understood that the second inactivity transition value M can be greater than the first inactivity transition value N in other embodiments.

As shown in FIG. 2, listen interval control circuit 110 initially sets the listen interval value LI equal to SLI (i.e., LI=1). In response, control processor 105 wakes up and attempts to detect beacon signals during the time periods represented by windows W1, W2, W3 and W4. In the described example, control processor 105 detects the beacon signals B1, B2, B3 and B4 received at the target beacon transmission times TBTT_1, TBTT_2, TBTT_3 and TBTT_4, respectively. Control processor 105 also determines that none of these beacon signals B1-B4 includes a delivery traffic indication message (DTIM).

Listen interval control circuit 110 determines that no other transmit/receive activity exists on WLAN link 140 during the N (i.e., three) listen intervals that occur from time TBTT_1 to time TBTT4, and in response, increases the listen interval value LI from SLI to TLI (i.e., LI=3). In response, control processor 105 wakes up and attempts to detect beacon signals during the time periods represented by windows W7, W10, W13 and W16. In the described example, control processor 105 detects the beacon signals B7, B10, B13 and B16 received at the target beacon transmission times TBTT_7, TBTT_10, TBTT_13 and TBTT_16, respectively. Control processor 105 also determines that none of these beacon signals B7, B10, B13 and B16 includes a delivery traffic indication message (DTIM).

Listen interval control circuit 110 determines that no other transmit/receive activity exists on the WLAN link 140 during the M (i.e., four) listen intervals that occur from time TBTT_4 to time TBTT_16, and in response, increases the listen interval value from TLI to MLI (i.e., LI=5). In response, control processor 105 wakes up and attempts to detect beacon signals during the time periods represented by windows W21 and W26. In the described example, control processor 105 detects the beacon signals B21 and B26 received at the target beacon transmission times TBTT_21 and TBTT_26, respectively. Control processor 105 also determines that neither of these beacon signals B21 or B26 includes a delivery traffic indication message (DTIM), and further determines that no other transmit/receive activity exists on WLAN link 140 during the two listen intervals that occur from time TBTT_16 to time TBTT_26. As a result, the listen interval value LI is maintained at MLI. Significant power savings are realized in the example of FIG. 2, because the control processor 105 does not need to wake up at each target beacon transmission time.

As described above, if listen interval control circuit 110 detects any transmit/receive activity on WLAN link 140 (i.e., determines that the ACTIVITY control signal is activated), then the listen interval control circuit 110 abruptly reduces the listen interval value LI to SLI.

Figure 3:
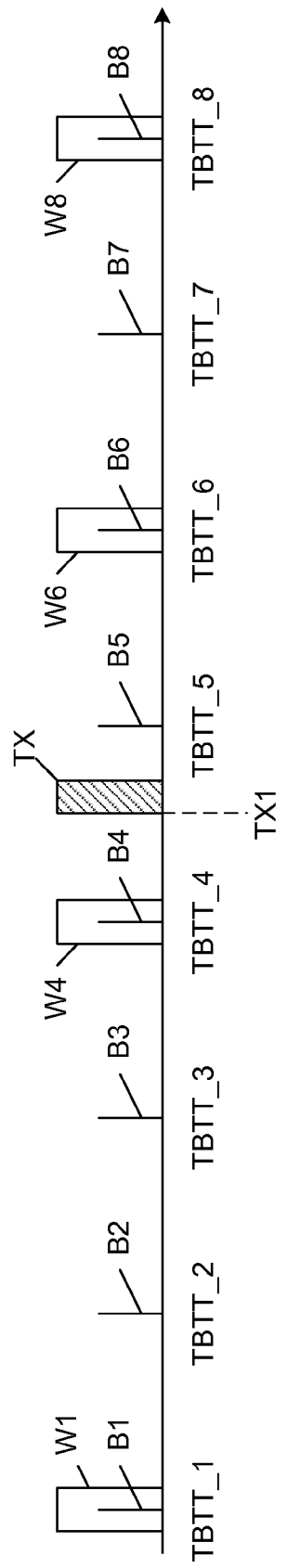
FIG. 3 is a timing diagram illustrating a method for reducing the listen interval of a WLAN client of FIG. 1 in response to detecting activity of a wireless link, in accordance with one embodiment of the present invention.

FIG. 3 is a timing diagram illustrating the manner in which the listen interval control circuit 110 reduces the listen interval value LI in response to detecting transmit/receive activity on WLAN link 140, in accordance with one embodiment of the present invention. As illustrated by FIG. 3, WLAN access point 150 periodically transmits beacon signals B1-B8 at target beacon transmission times TBTT_1-TBTT_8, respectively. In the illustrated example, listen interval control circuit 110 implements a start listen interval SLI of 2, and a transient listen interval TLI of 3.

At time TBTT_1, listen interval control circuit 110 provides a listening interval value LI equal to TLI (i.e., LI=3). In response, control processor 105 wakes up and attempts to detect beacon signals during the time periods represented by windows W1 and W4. In the described example, control processor 105 detects the beacon signals B1 and B4 received at the target beacon transmission times TBTT_1 and TBTT_4, respectively. Control processor 105 also determines that neither of these beacon signals B1, B4 includes a delivery traffic indication message (DTIM). In addition, listen interval control circuit 110 determines that no other transmit/receive activity exists on WLAN link 140 during the listen interval that occurs from time TBTT_1 to time TBTT4.

At time TX1, which occurs between times TBTT_4 and TBTT_5, link activity detecting unit 133 detects transmit activity (TX) from WLAN client 101 through transmit unit 131 to WLAN link 140. In response, link activity detecting unit 133 activates the ACTIVITY control signal. Upon detecting the activated ACTIVITY control signal, listen interval control circuit 110 immediately drops the listen interval value down to SLI (i.e., LI=2). In response, control processor 105 wakes up during the time period represented by window W6 (i.e., 2 beacon intervals after the previous wake up time).

Note that in the absence of the transmit activity TX, control processor 105 would have woken up during a window that included time TBTT_7, to detect beacon signal B7. The listen interval value LI remains at SLI until it ramps up in accordance with the procedure described above. That is, the listen interval value LI remains at SLI until no transmit/receive activity is detected for the number of consecutive listen intervals specified by the first inactivity transition value N.

Note that if the listen interval value LI is set to MLI at the time TX1 that the transmit activity TX is detected, the listen interval value LI would still be immediately reduced to SLI in the manner described above. Also note that listen interval control circuit 110 will similarly reduce the listen interval value LI to SLI in response to detecting receive activity on the WLAN link 140. That is, the moment unicast data frames are received on a downlink by WLAN client 101, the listen interval value LI is abruptly dropped down to SLI, where it remains, until ramping up in response to the absence of transmit/receive activity for a period of N listen intervals.

Typically, when WLAN client 101 listens to beacon signals transmitted from WLAN access point 150, WLAN client 101 synchronizes an internal clock with a TSF (time synchronization function) clock of WLAN access point 150, using a timestamp field included in the beacon signal. This ensures that the WLAN client 101 is following the TSF clock of WLAN access point 150 accurately. WLAN client 101 uses the synchronized internal clock to determine the next wakeup period (e.g., W1) to listen for the next beacon signal provided by WLAN access point 150. Typically, in a noisy environment, WLAN client 101 fails to detect (misses) 10-30 percent of the beacon signals transmitted by WLAN access point 150. Thus, missing beacon signals can be a fairly common phenomenon. However, missing beacon signals consecutively (i.e., three or four consecutive beacon signal misses) can create problems (e.g., loss of data), and may require WLAN client 101 to immediately resynchronize its internal clock with the TSF clock of WLAN access point 150.

Accordingly, one embodiment of the present invention provides a manner of operating WLAN client 101 in response to detecting a missed beacon signal, as well as detecting a plurality of consecutive missed beacon signals. In accordance with one embodiment, if a beacon signal is missed when WLAN client 101 implements a listen interval value LI of either TLI or MLI, WLAN client 101 immediately resets the listen interval value LI to SLI, such that WLAN client 101 will wake up during a window associated with the target beacon transmission time specified by SLI, rather than waking up during a window associated with the target beacon transmission time specified by either TLI or MLI. If WLAN client 101 detects a beacon signal upon waking up during the window associated with the target beacon transmission time specified by SLI, then WLAN client 101 will re-synchronize its internal clock with the TSF clock of the WLAN access point 150 in response to the TSF field included in the detected beacon signal. In this manner, WLAN client 101 is able to account for any required TSF correction.

Re-synchronizing WLAN client 101 in this manner can significantly reduce the latency associated with detecting a delivery traffic indication message (DTIM), if present, in a beacon signal provided by WLAN access point 150. For example, assume that the listen interval value LI of WLAN client 101 is set to MLI=5, and the beacon signals are transmitted at a beacon interval of 100 ms. If a single beacon miss occurs and the listen interval value LI is not adjusted, a buffered delivery traffic indication message (DTIM) may go undetected for a delay period that is approximately equal to two maximum listen intervals, or about 1 second (i.e., 2×5× 100 ms) in the described example. This delay in detecting the DTIM is quite large and undesirable for WLAN client 101. Moreover, this delay increases exponentially if consecutive beacon signals are missed.

In accordance with one embodiment of the present invention, listen interval control circuit 110 immediately reduces the listen interval value LI to SLI in response to detecting a beacon miss (i.e., in response to detecting the B_MISS control signal provided by beacon detecting unit 135 is activated). In the present example, assume that the start listen interval SLI is equal to 1, such that the listen interval control circuit 110 reduces the listen interval value from 5 to 1 in response to detecting a single beacon miss. In this case, a buffered delivery traffic indication message (DTIM) may go undetected for a maximum delay period that is approximately equal to one maximum listen interval (MLI) plus one start listen interval (SLI), or about 600 ms (i.e., 5×100 ms+100 ms) in the present example. Thus, reducing the listen interval value to SLI in the manner described above reduces the maximum delay in detecting a delivery traffic indication message by about 400 ms (i.e., 1 sec-600 ms).

The example described above assumes that a beacon signal is, in fact, detected during the listen interval specified by SLI. However, it is possible that a beacon signal may not be detected during this SLI listen interval. In this case, WLAN client 101 listens for a beacon signal at the next SLI listen interval. This process is repeated (i.e., the listen interval value LI remains at SLI) until a beacon signal is detected. If a beacon signal is detected before a predetermined number X of consecutive beacon misses are detected, then the listen interval value LI is returned to the listen interval value being implemented when the original beacon miss was detected (e.g., MLI in the present example). If a beacon signal is not detected before X consecutive beacon misses are detected, then the listen interval value LI remains at SLI, and is not increased until N consecutive beacon signals are detected without any transmit/receive activity (in the manner described above in connection with FIG. 2). The value X is hereinafter referred to as the maximum tolerable consecutive beacon miss threshold.

Assume, in the present example, that the maximum tolerable consecutive beacon miss threshold X is set equal to two. In this case, upon detecting a first beacon miss, listen interval control circuit 110 will immediately reduce the listen interval value LI to SLI in the above-described manner. However, if listen interval control circuit 110 detects a beacon signal (i.e., B_MISS is deactivated) during the next SLI listen interval, thereby avoiding the detection of two consecutive beacon misses, listen interval control circuit 110 will return the listen interval value LI to TLI or MLI (whichever was being implemented at the time the initial beacon miss was detected). However, if listen interval control circuit 110 detects two consecutive beacon misses, the listen interval value LI remains at SLI until being modified in the manner described above in connection with FIG. 2. In accordance with one embodiment, listen interval control circuit 110 includes a counter or similar device that keeps track of the number of detected consecutive beacon misses.

By enabling the listen interval value LI to be quickly returned to the listen interval value LI being implemented when a first missed beacon signal is detected, the present invention advantageously promotes power savings within WLAN client 101 (by potentially reducing the number of times the WLAN client 101 must wake up). In the example described above, listen interval control circuit 110 only has to set the listen interval value LI to SLI for one listen interval in response to detecting a single missed beacon, wherein listen interval control circuit 110 immediately restores the listen interval value LI to its pre-miss value upon detecting a beacon signal during the next (SLI defined) listen interval. In contrast, if the listen interval control circuit 110 were to simply reset the listen interval value LI to SLI in response to detecting a single missed beacon, a significant amount of time (and waking up WLAN client 101) would be required to return the listen interval value LI from SLI to the maximum listen interval MLI. For example, in the embodiment illustrated by FIG. 2, it requires 15 beacon intervals (wherein WLAN client 101 is woken up 8 times) for the listen interval value LI to increase to MLI after being reset to SLI at time TBTT_1.

Figure 4:
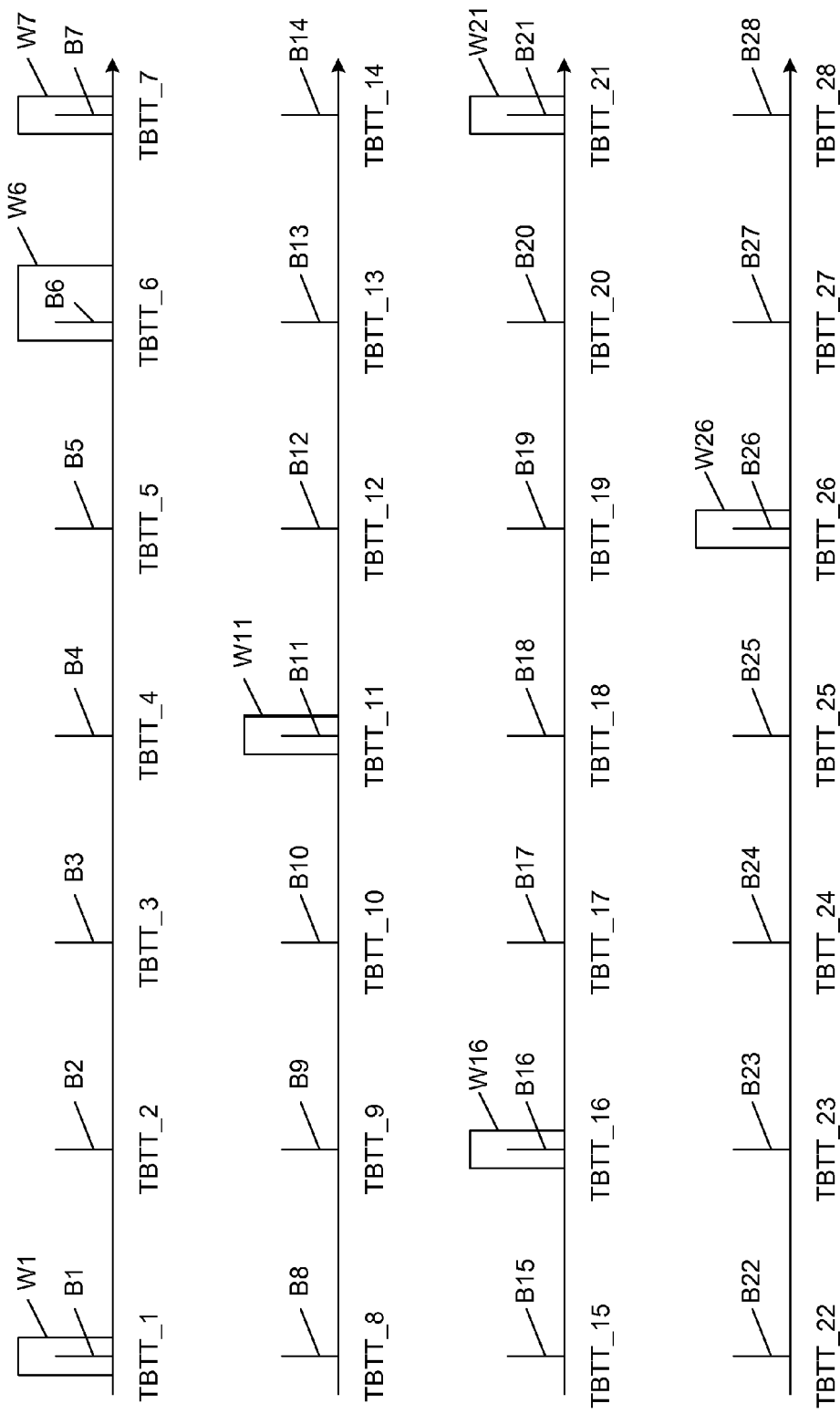
FIG. 4 is a timing diagram illustrating a method for temporarily reducing the listen interval of a WLAN client of FIG. 1 in response to detecting at least one, but fewer than a predetermined number, of consecutive beacon misses, in accordance with embodiment of the invention.

FIG. 4 is a timing diagram illustrating the manner in which the listening interval of WLAN client 101 is adjusted in response to detecting at least one, but fewer than X, consecutive beacon misses while having a pre-beacon miss listen interval of MLI, in accordance with embodiment of the invention.

As illustrated by FIG. 4, WLAN access point 150 periodically transmits beacon signals B1-B28 at target beacon transmission times TBBT_1-TBTT_28, respectively, in the manner described above in connection with FIG. 2. In the illustrated embodiment, listen interval control circuit 110 implements a start listen interval (SLI) of 1, a transient listen interval (TLI) of 3 and a maximum listen interval (MLI) of 5. Listen interval control circuit 110 also implements a first inactivity transition value N equal to 3, and a second inactivity transition value M equal to 4. Listen interval control circuit 110 also implements a maximum tolerable consecutive beacon miss threshold X equal to 2 in the present example.

As shown in FIG. 4, listen interval control circuit 110 has been operating for a while, and the listen interval value LI is set to MLI (i.e., LI=5) from times TBTT_1 to TBBT_6. As a result, control processor 105 wakes up during the time period represented by window W1, wherein the corresponding beacon signal B1 (and no transmit/receive activity or DTIM) is detected. Control processor 105 subsequently wakes up five beacon intervals later, during the time period represented by window W6. However, the WLAN client 101 fails to detect the beacon signal B6 during this window W6 (e.g., due to noise on WLAN link 140 or other medium characteristics.) As a result, beacon detection unit 135 activates the B_MISS control signal.

In response to receiving the activated B_MISS control signal (i.e., upon failure to detect the beacon signal B6), listen interval control circuit 110 temporarily reduces the listen interval value LI from MLI to SLI (i.e., LI=1). As a result, control processor 105 subsequently wakes up one beacon interval later, during the time period represented by window W7. In the example illustrated by FIG. 4, the WLAN client 101 detects the beacon signal B7 (and no transmit/receive activity or DTIM) during the time period represented by window W7. In response, listen interval control circuit 110 immediately returns to the listen interval specified before the failure to detect the beacon signal B6 during window W6. That is, listen interval control circuit 110 immediately returns the listen interval value LI to MLI (i.e., LI=5). As a result, control processor 105 subsequently wakes up during the time period represented by window W11 (i.e., 5 beacon intervals after time TBTT_6). Upon detecting the beacon signal B11 (and no transmit/receive activity or DTIM) during window W11, listen interval control circuit 110 maintains the listen interval value LI at MLI, such that the control processor 105 subsequently wakes up during time periods specified by windows W16, W21 and W26, as illustrated.

Figure 5:
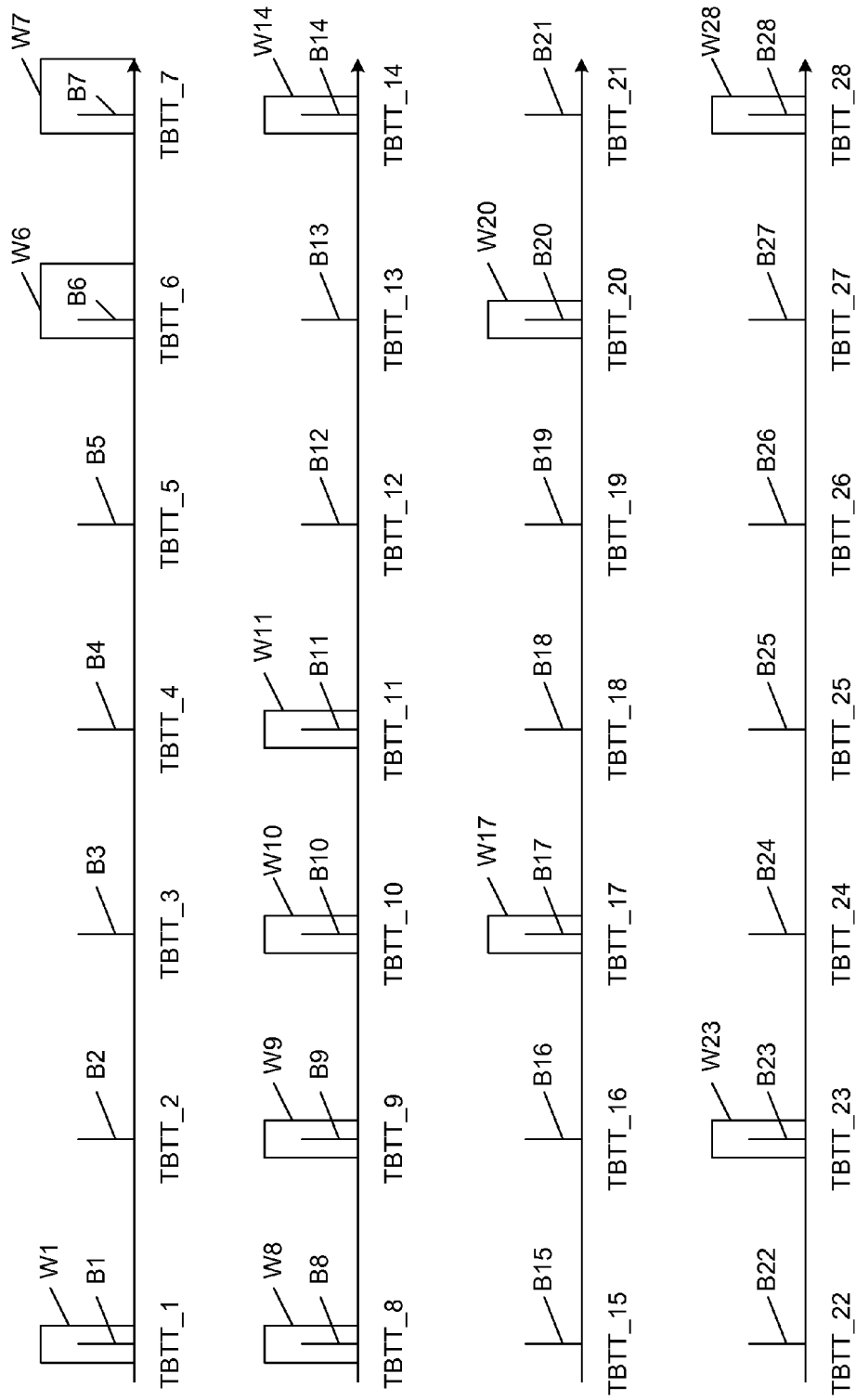
FIG. 5 is a timing diagram illustrating a method for reducing the listen interval of a WLAN client of FIG. 1 in response to detecting a predetermined number of consecutive beacon misses, in accordance with embodiment of the invention.

FIG. 5 is a timing diagram illustrating the manner in which the listening interval of the WLAN client 101 is adjusted in response to detecting a number of consecutive beacon misses that exceeds the maximum tolerable consecutive beacon miss threshold X, in accordance with one embodiment of the present invention. The operating parameters of WLAN client 101 represented by FIG. 5 are the same as the operating parameters described above in connection with FIG. 4 (i.e., SLI=1, TLI=3, MLI=5, N=3, M=4, X=2).

As shown in FIG. 5, the listen interval value LI is initially set to MLI (i.e., LI=5) from times TBTT_1 to TBBT_6. WLAN client 101 operates in the same manner described above in connection with FIG. 4 from times TBTT_1 to TBTT_6. Thus, control processor 105 wakes up during the time period defined by window W6, but fails to detect the corresponding beacon signal B6 (e.g., due to noise on WLAN link 140 or other medium characteristics.) As a result, beacon detection unit 135 activates the B_MISS control signal.

In response to receiving the activated B_MISS control signal (i.e., upon failure to detect the beacon signal B6), listen interval control circuit 110 temporarily reduces the listen interval value LI from MLI to SLI (i.e., LI=1). As a result, control processor 105 subsequently wakes up one beacon interval later, during the time period represented by window W7. In the example illustrated by FIG. 5, the WLAN client 101 fails to detect the beacon signal B7 during the time period represented by window W7. As a result, beacon detection unit 135 activates the B_MISS control signal, thereby informing listen interval control circuit 110 that there has been a failure to detect a second consecutive beacon signal (i.e., a second consecutive beacon miss has been detected). In response to detecting that the number of consecutive beacon misses has reached the maximum tolerable consecutive beacon miss threshold of 2, listen interval control circuit 110 resets the listen interval value LI to SLI (i.e., LI=1). As a result, control processor 105 subsequently wakes up during the time period represented by window W8 (i.e., 1 beacon interval after time TBTT_7). In the example illustrated by FIG. 5, WLAN client 101 detects the beacon signals B8, B9, B10 and B11 (and no transmit/receive activity or DTIM) during corresponding windows W8, W9, W10 and W11, with the listen interval value LI set at SLI. The listen interval value LI is then increased to TLI (i.e., LI=3), in the manner described above in connection with FIG. 2. The WLAN client 101 then detects beacon signals B14, B17, B20 and B23 (and no transmit/receive activity or DTIM) during corresponding windows W14, W17, W20 and W23, with the listen interval value LI set at TLI. The listen interval value LI is then increased to MLI (i.e., LI=5), in the manner described above in connection with FIG. 2. The WLAN client 101 subsequently detects beacon signal B28 during the corresponding window W28.

Although the examples described above in connection with FIGS. 4 and 5 assume that the listen interval value LI is initially equal to MLI, it is understood that the WLAN client 101 would operate in a similar manner if the listen interval value LI was initially equal to TLI.

The various embodiments described above provide significant power savings within WLAN client 101 with minimal impact on performance. In the description above, the features of adjusting the listen interval have been explained using a total of three different listen intervals. Many more or less intervals could be used as well, using the same principles. A person skilled in the art will understand that the adjustment concepts for those scenarios are not different, and are all covered in this application.

Additionally, methods other than those described above for ramping up and ramping down the listen interval value can be implemented in various embodiments. These methods can be static or dynamic, in which they tune themselves to the particular network circumstances. For example, when activity is detected on the link, the listening interval value LI can be reduced from MLI to TLI and then later reduced to SLI in an another embodiment of the invention, which does not give as good performance results as immediately dropping the listening interval to SLI based on traffic characteristics (e.g., amount of activity) on the link.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. For example, three listen intervals are used in the exemplary embodiments described above, but those skilled in the art will understand that the same concepts apply for any number of listen intervals, whether it be two, four, or some other number of listen intervals, while remaining within the spirit and scope of the invention. Moreover, while the various listen intervals (e.g., SLI, TLI, MLI), the first inactivity transition value N, the second inactivity transition value M, and the maximum tolerable consecutive beacon miss threshold X have been described as having particular values in accordance with the particular embodiments, it is understood that these values can be modified to have other values in other embodiments, without departing from the scope of the present invention. Moreover, it is understood that in accordance with another embodiment, these values can be dynamically modified in response to actual detected operating characteristics of the WLAN client, thereby improving power savings realized by the WLAN client. Thus, the present disclosure is not intended to be limited to the embodiments shown herein but is to be accorded the widest scope consistent with the principles and novel features disclosed herein.

What is claimed is:

1. A method comprising:
periodically waking up a wireless local area network (WLAN) client at a first interval to detect a beacon signal, wherein beacon signals are periodically transmitted on a wireless link at a beacon interval, wherein the first interval is equal to a plurality of beacon intervals;
determining that the WLAN client has not detected a beacon signal on the wireless link while periodically waking up at the first interval, and in response, waking up the WLAN client at a next beacon interval; and
determining that the WLAN client has detected a beacon signal on the wireless link while waking up at the next beacon interval, and in response, periodically waking up the WLAN client at the first interval to detect beacon signals transmitted on the wireless link.

2. A method comprising:
periodically waking up a wireless local area network (WLAN) client at a first interval to detect a beacon signal, wherein beacon signals are periodically transmitted on a wireless link at a beacon interval, wherein the first interval is equal to a plurality of beacon intervals;
determining that the WLAN client fails to detect a beacon signal on the wireless link while periodically waking up at the first interval, and in response, waking up the WLAN client at a next beacon interval;
incrementing a beacon miss counter for each beacon interval in which the WLAN client fails to detect a beacon signal, wherein the beacon miss counter is incremented until the WLAN client detects a beacon signal;
determining that the WLAN client detects a beacon signal, and in response, determining if the beacon miss counter exceeds a predetermined threshold;
upon determining that the beacon miss counter does not exceed a threshold, waking up the WLAN client at the first interval; and
upon determining that the beacon miss counter exceeds a threshold, waking up the WLAN client at the beacon interval.

3. A method comprising:
periodically waking up a wireless local area network (WLAN) client at a first interval to detect a beacon signal, wherein beacon signals are periodically transmitted on a wireless link at a beacon interval, wherein the first interval is equal to a plurality of beacon intervals;
determining whether or not the WLAN client detects a beacon signal on the wireless link upon waking up;
identifying a beacon miss if the WLAN client does not detect a beacon signal on the wireless link upon waking up, and in response to identifying a beacon miss while the WLAN client is periodically waking up at the first interval, waking up at a next beacon interval and reducing the first interval at which the WLAN client periodically wakes up to the beacon interval; and
determining that the WLAN client detects a beacon signal on the wireless link upon waking up at the beacon interval, and in response, returning the interval at which the WLAN client periodically wakes up to the first interval.

4. The method of claim 3, further comprising:
identifying a plurality of consecutive beacon misses with the WLAN client; and
continuing to periodically wake up the WLAN client at the beacon interval in response to identifying a first number of consecutive beacon misses with the WLAN client.

5. A method comprising:
selecting an interval for waking up a wireless local area network (WLAN) client to detect a beacon signal, wherein beacon signals are periodically transmitted on a wireless link at a beacon interval, wherein the interval can be selected to have a first period equal to the beacon interval or a second period, wherein the second period equal to a first plurality of beacon intervals;
waking up at a next beacon interval and selecting the interval to have the first period in response to detecting that an applications processor of the WLAN client is in an awake state;
waking up at a next beacon interval and selecting the interval to have the first period in response to detecting activity on the wireless link; and
waking up at a next beacon interval and selecting the interval to have the first period in response to failing to detect an expected beacon signal on the wireless link.

6. The method of claim 5, further comprising increasing the interval from the first period to the second period in response to detecting an absence of activity on the wireless link for a first number N of consecutive occurrences of the first period.

7. The method of claim 6, wherein the interval can be selected to have a third period, greater than the second period, the method further comprising increasing the interval from the second period to the third period in response to detecting the absence of activity on the wireless link for a second number M of consecutive occurrences of the second period.

8. The method of claim 7, wherein interval can be selected to have the third period, greater than the second period, wherein the third period is equal to a second plurality of the beacon intervals.

9. A wireless local area network (WLAN) client comprising:
- a link activity detection circuit that detects an absence of transmit and receive activity on a wireless link used by the WLAN client;
- a beacon detection circuit that determines whether an expected beacon signal is detected on the wireless link;
- an applications processor that runs one or more applications on the WLAN client; and
- a listen interval control circuit coupled to the link activity detection circuit, the beacon detection circuit and the applications processor, wherein the listen interval control circuit selects a listen interval for waking up the WLAN client to detect beacon signals transmitted on the wireless link and a control processor wakes up the WLAN client at a next beacon interval and based on input received from at least one of the link activity detection circuit or the beacon detection circuit; and
- a control processor coupled to the listen interval control circuit, wherein the control circuit wakes up the WLAN client at a next beacon interval based on input received from at least one of the link activity detection circuit or the beacon detection circuit.

10. The WLAN client of claim 9, wherein the control processor wakes up the WLAN client in response to a listen interval value provided by the listen interval control circuit.

11. The WLAN client of claim 9, wherein the listen interval control circuit includes means for selecting the listen interval to have a first period or a second period, greater than the first period, in response to information received from the link activity detection circuit, the beacon detection circuit and the applications processor.

12. The WLAN client of claim 9, wherein the listen interval control circuit is coupled to the beacon detection circuit by a control line that carries a control signal that indicates whether or not an expected beacon signal is detected on the wireless link.

13. The WLAN client of claim 9, wherein the listen interval control circuit is coupled to the link activity detection circuit by a control line that carries a control signal that indicates whether or not the link activity detection circuit detects activity on the wireless link.

14. The WLAN client of claim 9, wherein the listen interval control circuit is coupled to the applications processor by a control line that carries a control signal that indicates whether or not the applications processor is in an awake state.

15. A non-transitory computer readable medium storing computer program product for setting a listening interval (LI) for a wireless local area network (WLAN) client, the program product, when executed by a computer, causing the computer to perform the functions of:
- selecting an interval for waking up a wireless local area network (WLAN) client to detect a beacon signal, wherein beacon signals are periodically transmitted on a wireless link at a beacon interval, wherein the interval can be selected to have a first period equal to the beacon interval or a second period equal to a plurality of beacon intervals;
- waking up at a next beacon interval and selecting the interval to have the first period in response to detecting that an applications processor of the WLAN client is in an awake state;
- waking up at a next beacon interval and selecting the interval to have the first period in response to detecting transmit/receive activity on the wireless link; and
- waking up at a next beacon interval and selecting the interval to have the first period in response to failing to detect an expected beacon signal on the wireless link.

16. A non-transitory computer readable medium storing computer program product for setting a listening interval (LI) for a wireless local area network (WLAN) client, the program product, when executed by a computer, causing the computer to perform the functions of:
- periodically waking up a wireless local area network (WLAN) client at a first interval to detect a beacon signal, wherein beacon signals are periodically transmitted on a wireless link at a beacon interval, wherein the first interval is equal to a plurality of beacon intervals;
- determining whether or not the WLAN client detects a beacon signal on the wireless link upon waking up;
- identifying a beacon miss if the WLAN client does not detect a beacon signal on the wireless link upon waking up, and in response to identifying a beacon miss while the WLAN client is periodically waking up at the first interval, waking up at a next beacon interval and reducing the first interval at which the WLAN client periodically wakes up to the beacon interval; and
- determining that the WLAN client detects a beacon signal on the wireless link upon waking up at the beacon interval, and in response, returning the interval at which the WLAN client periodically wakes up to the first interval.

* * * * *